(12) United States Patent
Lin et al.

(10) Patent No.: US 9,472,952 B2
(45) Date of Patent: Oct. 18, 2016

(54) BATTERY MODULE, METHOD FOR MANAGING SUPPLY OF ELECTRICAL POWER BY THE BATTERY MODULE, AND POWER SUPPLY DEVICE HAVING THE BATTERY MODULE

(71) Applicants: LITE-ON ELECTRONICS (GUANGZHOU) LIMITED, Guangzhou (CN); LITE-ON TECHNOLOGY CORP., Taipei (TW)

(72) Inventors: Liang-Chun Lin, Taipei (TW); Te-Yu Chou, Taipei (TW); Ming-Wang Cheng, Taipei (TW); Wei-Lieh Lai, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 279 days.

(21) Appl. No.: 14/252,938

(22) Filed: Apr. 15, 2014

(65) Prior Publication Data

US 2015/0022156 A1 Jan. 22, 2015

(30) Foreign Application Priority Data

Jul. 22, 2013 (CN) .......................... 2013 1 0309755

(51) Int. Cl.
*H02J 7/00* (2006.01)
*H02J 1/10* (2006.01)
*H02J 7/34* (2006.01)
*H02J 9/06* (2006.01)

(52) U.S. Cl.
CPC .. *H02J 1/10* (2013.01); *H02J 7/34* (2013.01); *H02J 9/06* (2013.01)

(58) Field of Classification Search
USPC ........................................................ 320/134
See application file for complete search history.

(56) References Cited

U.S. PATENT DOCUMENTS

| 2006/0097700 | A1* | 5/2006 | Studyvin | ............... H02J 7/0016 320/138 |
| 2007/0210758 | A1* | 9/2007 | Gangstoe | ............... H02J 7/0031 320/134 |
| 2013/0113437 | A1* | 5/2013 | Ishibashi | ................... H02J 7/00 320/136 |
| 2013/0181526 | A1* | 7/2013 | Iwasaki | ............... H01M 10/441 307/43 |

OTHER PUBLICATIONS

Hua et al. An Event-Driven Ultra-Low-Current Battery Management System with Reconfigurable Linear Regulator for Multi-Cell Battery Applications, May 20-23, 2012, Circuits and Systems (ISCAS), 2012 IEEE International Symposium on, pp. 970-973.*

* cited by examiner

*Primary Examiner* — Paul Dinh
*Assistant Examiner* — Bryce Aisaka
(74) *Attorney, Agent, or Firm* — Rosenberg, Klein & Lee

(57) ABSTRACT

A battery module includes a plurality of battery units, each of which supplies electrical power to a load through a respective linear regulator. In a method for managing supply of electrical power by the battery module, a number of battery units that supply electrical power to the load is controlled according to magnitude of a current required by the load, so as to reduce power loss in the linear regulators.

19 Claims, 8 Drawing Sheets

BATTERY MODULE, METHOD FOR MANAGING SUPPLY OF ELECTRICAL POWER BY THE BATTERY MODULE, AND POWER SUPPLY DEVICE HAVING THE BATTERY MODULE

CROSS-REFERENCE TO RELATED APPLICATION

This application claims priority to Chinese Application No. 201310309755.5, filed on Jul. 22, 2013.

BACKGROUND OF THE INVENTION

1. Field of the Invention

The invention relates to a battery module, a method for managing supply of electrical power by a battery module, and a power supply device having the battery module, and more particularly to a battery module, a method for managing supply of electrical power by a battery module, and a power supply device having the battery module that may properly control a number of battery units of the battery module that supply electrical power according to a current required by the load.

2. Description of the Related Art

Many electrical machines used in everyday life, such as televisions, computers, printers, mobile phones, gaming machines, portable audio players, etc., operate with direct current (DC) power. A DC power supply system is important for an electronic device since it provides stable supply or portability of DC power, such that application of the electronic device is not limited due to lack of power.

For example, a UPS (uninterruptible power supply) system is configured to serve as a temporary and emergency power supply when a power source of a computer is abnormally interrupted or unstable, so that the computer may not suffer from data loss or system damage due to abnormal supply of electrical power. Referring to FIG. 1, a conventional UPS device 1 includes a voltage distribution unit 11 that converts electrical power from a three-phase alternating-current (AC) power source 100 to single-phase AC electrical power, and a power supply unit 12 that converts the single-phase AC electrical power provided by the voltage distribution unit 11 to DC electrical power. The DC electrical power is provided to a load, such as a server 200, and to a charging circuit 13 that converts the DC electrical power to a voltage rating of a battery 14 for charging the battery 14. The battery 14 is coupled to a transformer module 15. A switch 16 is coupled between the transformer module 15 and the server 200 and is controlled by the power supply unit 12. When the AC power source 100 stops output of electrical power, the power supply unit 12 controls the switch 16 to make electrical connection between the transformer module 15 and the server 200, so that the battery 14 outputs electrical power that is subsequently converted by the transformer module 15 to DC electrical power required by the server 200. The converted DC electrical power is then provided to the server 200 through the switch 16, thus achieving uninterrupted power supply.

However, the conventional UPS device 1 is only suitable for a single load. In addition to requirement of the voltage distribution unit 11 for converting AC power into DC power, the transformer module 15 of the conventional UPS device 1 is usually implemented using a switching DC-DC converter, which is relatively complicated and has a relatively large size, making it difficult to reduce the size of the UPS device 1, and thus disfavoring application to electronic products that tend to have a light weight and a small size.

SUMMARY OF THE INVENTION

Therefore, an object of the present invention is to provide a method for managing supply of electrical power by a battery module of the present invention to a load. The method may control a number of battery units of the battery module that supply electrical power according to a current required by the load, so as to prolong service time and promote performance of the battery module.

According to one aspect of the present invention, a method is provided for managing supply of electrical power by a battery module to a load. The battery module includes N battery units, N linear regulators, N switches, and a battery management unit, where N≥2. Each of the switches is coupled between a respective one of the battery units and an input of a respective one of the linear regulators. Outputs of the linear regulators are coupled together and are coupled to the load. The battery management unit is configured to control each of the switches to make or break electrical connection between the respective one of the battery units and the input of the respective one of the linear regulators. The method comprises:

(A) controlling, by the battery management unit at the start of a discharge period of the battery units, all of the switches to make electrical connections for coupling each of the linear regulators to the respective one of the battery units, so that an output current of each of the battery units is outputted via the output of the respective one of the linear regulators, thereby providing to the load a total current composed of the output currents outputted from the linear regulators; and (B) acquiring, by the battery management unit, magnitude information of the output currents outputted by the N battery units, determining, by the battery management unit, whether or not a total magnitude of the output currents outputted by the N battery units ranges between a magnitude of a current rating of one of the battery units and N times the magnitude of the current rating, and controlling, by the battery management unit when determination made thereby is affirmative, only M of the N switches to make electrical connections, where 2≤M≤N, and M is determined by the total magnitude of the output currents outputted by the N battery units ranges between (M−1) times the magnitude of the current rating and M times the magnitude of the current rating.

Another object of the present invention is to provide a battery module that implements the method of the present invention, so as to prolong service time and promote performance thereof.

According to another aspect of the present invention, a battery module is adapted for supplying electrical power to a load, and comprises:

N battery units, where N≥2;

N linear regulators, each of which has an input and an output, the outputs of the N linear regulators being coupled together and to be coupled to the load;

N switches, each of which is coupled between a respective one of the battery units and the input of a respective one of the linear regulators; and a battery management unit configured to control each of the switches to make or break electrical connection between the respective one of the battery units and the input of the respective one of the linear regulators.

Yet another object of the present invention is to provide a power supply device that includes the battery module of the present invention, and that may have a relatively small size, reduced cost, and promoted power conversion efficiency.

According to yet another aspect of the present invention, a power supply device is adapted to receive an input from a direct-current (DC) power source and to supply electrical power to a load. The power supply device comprises:

a power cord to be coupled between the DC power source and the load for transmitting electrical power to the load;

a battery module coupled to the power cord for receiving and storing power from the DC power source, the battery module including:

N battery units, where N≥2;

N linear regulators, each of which has an input and an output, the outputs of the N linear regulators being coupled together and to the power cord;

N switches, each of which is coupled between a respective one of the battery units and the input of a respective one of the linear regulators; and a battery management unit configured to control each of the switches to make or break electrical connection between the respective one of the battery units and the input of the respective one of the linear regulators;

a voltage detecting circuit coupled to the power cord; and a control unit coupled to the battery module and the voltage detecting circuit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
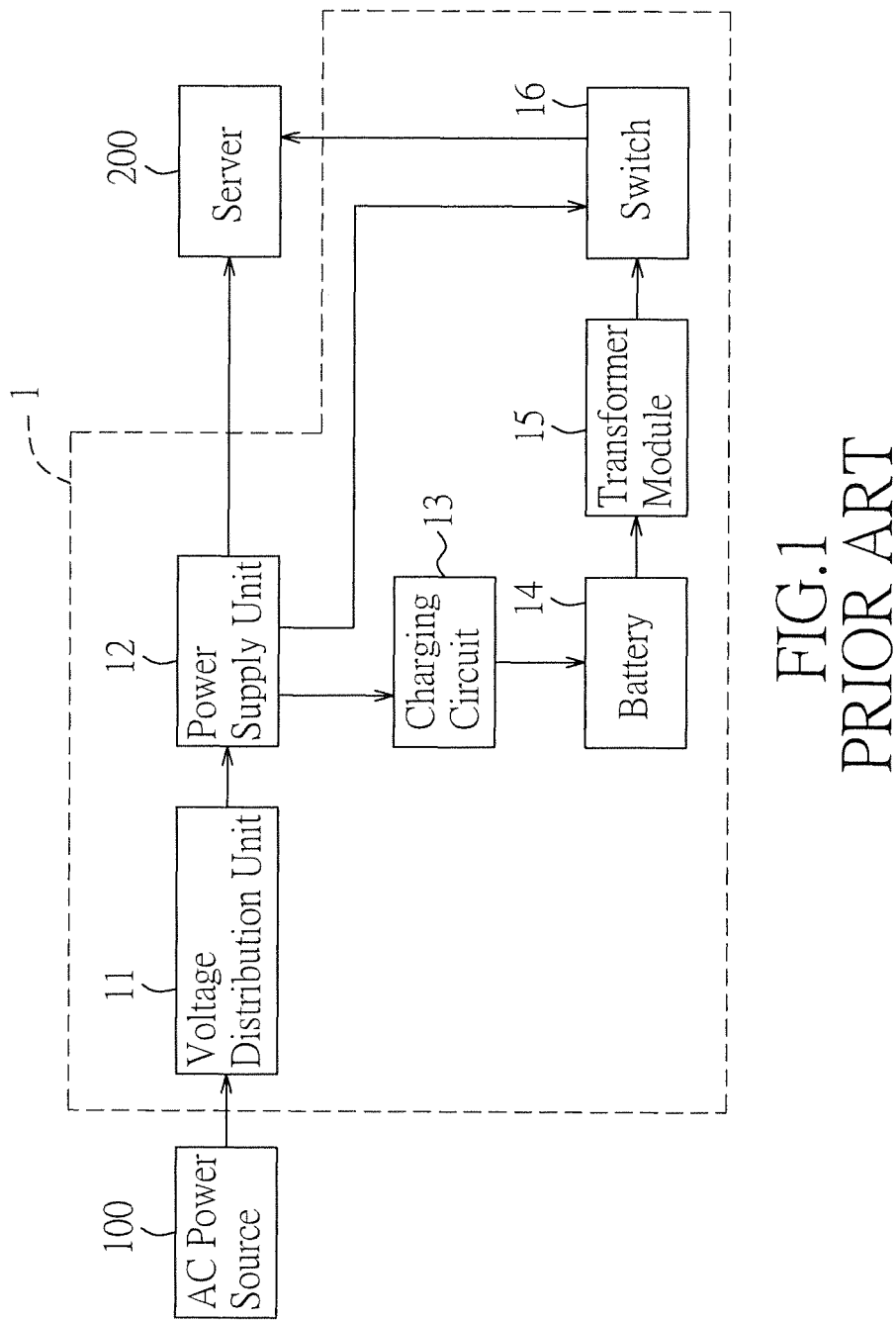
FIG. 1 is a block diagram illustrating a conventional uninterruptible power supply device.
Figure 2:
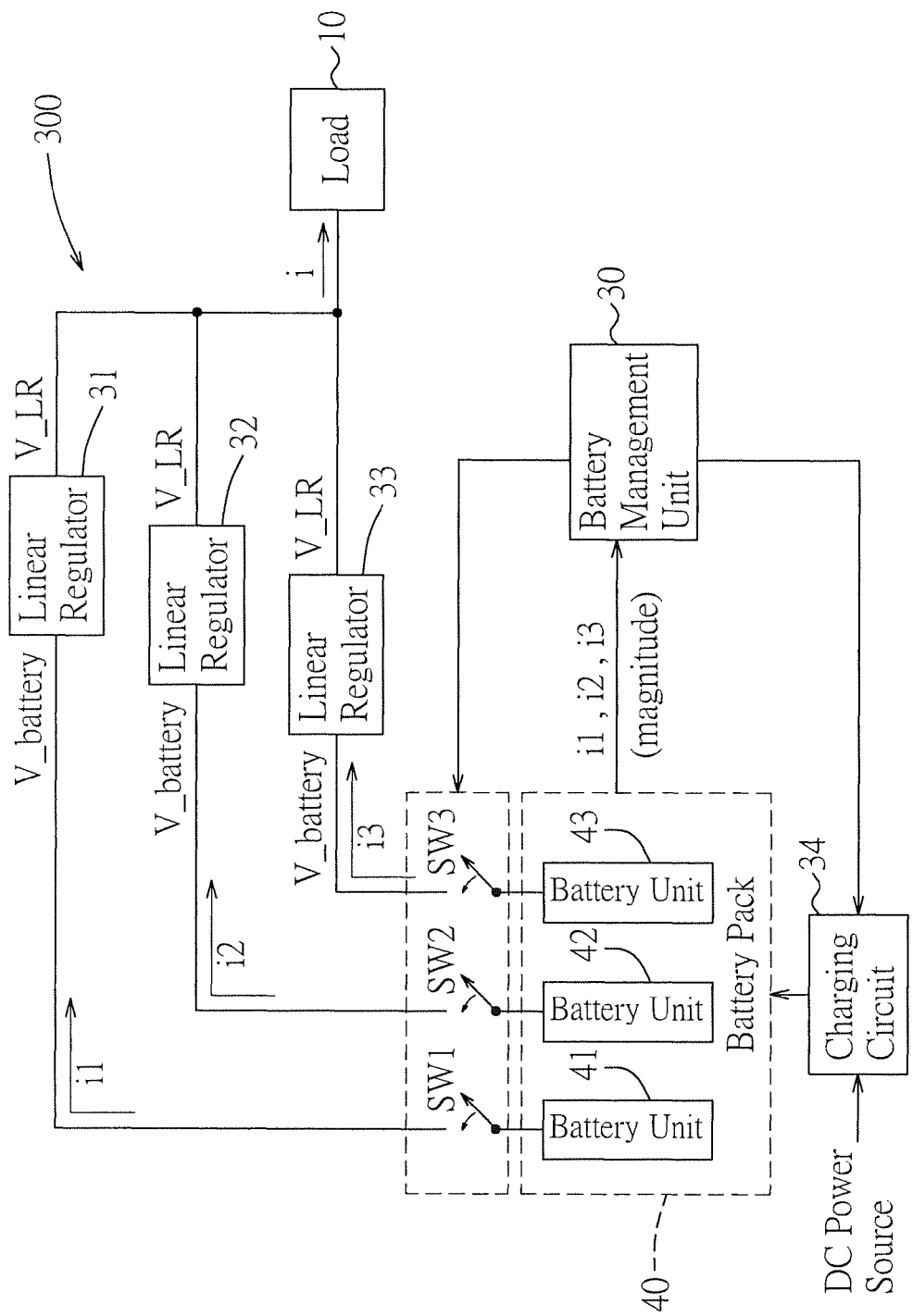
FIG. 2 is a block diagram illustrating a preferred embodiment of a battery module according to the present invention.

FIG. 2 is a block diagram illustrating a preferred embodiment of the battery module 300 according to this invention. The battery module 300 is adapted for supplying electrical power to a load 10, and comprises a battery pack 40 that includes N battery units, N linear regulators, N switches and a battery management unit 30, where N≥2, and N is a positive integer. In this embodiment, N is equal to 3, but is not limited thereto. The battery unit described herein may be a single battery, or series-connected batteries. Each of the three switches SW1, SW2, SW3 is coupled between a respective one of the three battery units 41, 42, 43 and an input of a respective one of the three linear regulators 31, 32, 33 for making or breaking electrical connection therebetween. Outputs of the linear regulators 31, 32, 33 are coupled together and are coupled to the load 10. The battery units 41, 42, 43 may be rechargeable batteries. The battery module 300 further includes a charging circuit 34 coupled to a direct-current (DC) power source for receiving electrical power therefrom, controlled by the battery management unit 30, and operable to charge the battery units 41, 42, 43.

Figure 3:
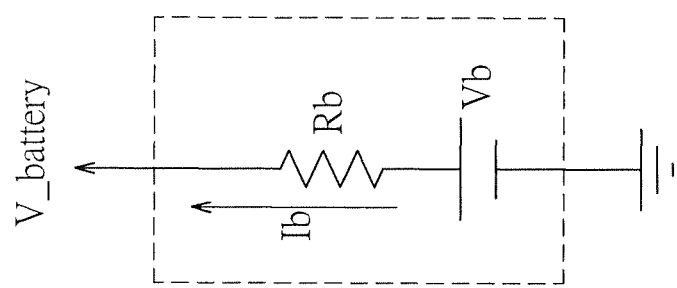
FIG. 3 is a schematic circuit diagram illustrating an equivalent circuit of a battery unit of the preferred embodiment.

FIG. 3 illustrates an equivalent circuit of each of the battery units 91, 42, 43 of this embodiment, which includes an internal voltage source having a voltage Vb and an internal resistor having a resistance Rb. Therefore, an external battery voltage V_battery of a battery unit is equal to a difference between the voltage Vb and a voltage drop resulting from an output current Ib of the battery unit flowing through the internal resistor, as shown in the following equation (1):

$$V\_battery = Vb - Ib \times Rb \tag{1}$$

It is evident from equation (1) that greater output current Ib results in greater voltage drop across the internal resistor, which may lead to lower external battery voltage V_battery.

Figure 4:
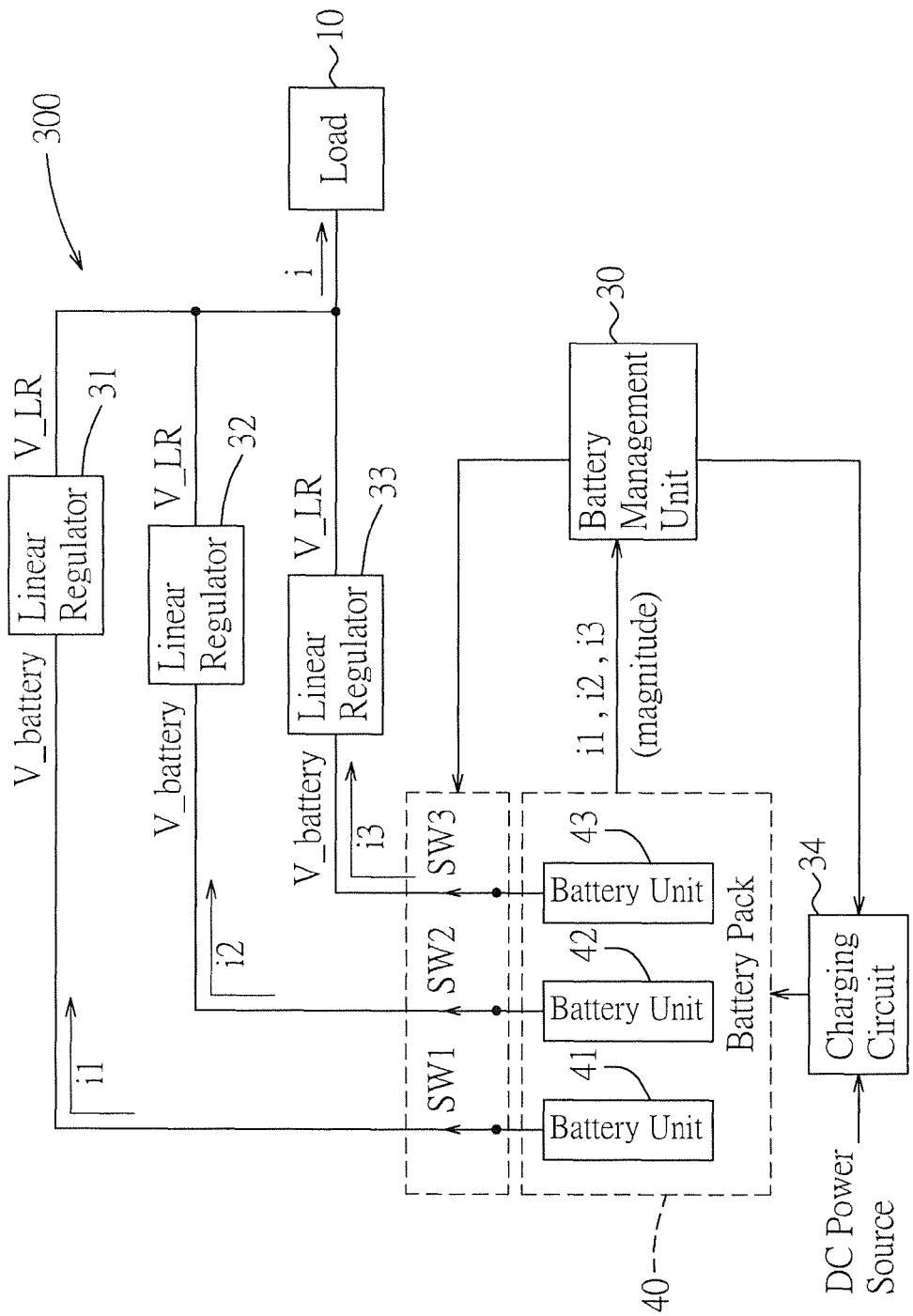
FIG. 4 is a block diagram illustrating that the battery units of the battery module of the preferred embodiment are respectively coupled to corresponding linear regulators.

In general, for providing sufficient current to the load 10, the battery units 41, 42, 43 are respectively coupled to the linear regulators 31, 32, 33, as shown in FIG. 4, so that output currents i1, i2, i3 of the battery units 41, 42, 43 are respectively outputted via outputs of the linear regulators 31, 32, 33, thereby providing to the load 10 a total current i composed of the output currents outputted from the linear regulators 31-33.

However, since the linear regulators 31-33 are characterized by low dropout conversion, smaller dropout voltage between the input and the output thereof results in better conversion efficiency. Therefore, in this embodiment, when the total current i required by the load 10 is equal to three times a current rating (i.e., the maximum output current) of the battery unit of this embodiment, each of the output currents i1, i2, i3 is equal to the current rating of the battery unit, and the external battery voltage V_battery of each of the battery units 41-43 has the minimum magnitude. At this time, a difference between the external battery voltage V_battery of each of the battery units 41-43 and output voltage V_LR of the corresponding one of the linear regulators 31-33 is at a minimum, and the linear regulators 31-33 have the maximum conversion efficiency. On the other hand, when the total current i required by the load 10 is less than two times the magnitude of the current rating, or even that which can be supported by only one battery unit, since each of the output currents i1, i2, i3 shares only one-third of the total current i, the external battery voltage V_battery of each of the battery units 41-43 may be higher so that the difference between the external battery voltage V_battery thereof and output voltage V_LR of the corresponding one of the linear regulators 31-33 becomes greater, thereby resulting in lower conversion efficiency of the linear regulators 31-33, and possible damage to the linear regulators 31-33 because of rising of the temperature.

Hence, to reduce voltage drop (ΔV) across each of the linear regulators 31-33 (i.e., difference between the external battery voltage V_battery of each of the battery units 41, 42, 43 and the output voltage V_LR of the corresponding one of the linear regulators 31, 32, 33) may contribute to reduction of total energy conversion loss (P=ΔV×i) of the linear regulators 31-33.

Details are described hereinafter.

The voltage drop (ΔV) across a single linear regulator may be represented as:

$$\Delta V = \text{V\_battery} - \text{V\_LR} \qquad (2)$$
$$= Vb - Ib \times Rb - \text{V\_LR}$$

According to equation (2), when only the pair of the battery unit 41 and the linear regulator 31 are electrically connected, the current i1 corresponds to the total current i, and power loss of the linear regulator 31 may be represented as:

$$P1 = \Delta V \times i \qquad (3)$$
$$= (Vb - i \times Rb - \text{V\_LR}) \times i$$

Similarly, when only two battery units 41, 42 are electrically connected to the corresponding linear regulators 31, 32, each of the currents i1, i2 is equal to i/2, and total power loss of the linear regulators 31, 32 may be represented as:

$$P2 = (Vb - (i/2) \times Rb - \text{V\_LR}) \times (i/2) \times 2 \qquad (4)$$
$$= (Vb - (i/2) \times Rb - \text{V\_LR}) \times i$$

When all of the three battery units 41, 42, 43 are electrically connected to the corresponding linear regulators 31, 32, 33, each of the currents i1, i2, i3 is equal to i/3, and total power loss of the linear regulators 31, 32, 33 may be represented as:

$$P3 = (Vb - (i/3) \times Rb - \text{V\_LR}) \times (i/3) \times 3 \qquad (5)$$
$$= (Vb - (i/3) \times Rb - \text{V\_LR}) \times i$$

It can be derived that when N battery units are respectively coupled to N linear regulators, the total power loss of the N linear regulators may be represented as:

$$PN = (Vb - (i/N) \times Rb - \text{V\_LR}) \times (i/N) \times N \qquad (6)$$
$$= (Vb - (i/N) \times Rb - \text{V\_LR}) \times i$$

It is evident from equation (6) that when a number of electrical connections between the battery units and corresponding linear regulators increases, the output current of each of the battery units is smaller, resulting in higher external battery voltage V_battery, so that the voltage across the output and the input of the corresponding linear regulator becomes greater, resulting in greater power loss in the linear regulator. If the number of electrical connections between the battery units 41, 42, 43 and the corresponding linear regulators 31, 32, 33 can be properly adjusted according to the total current i required by the load 10, power loss of the linear regulators 31, 32, 33 may be reduced.

Figure 5:
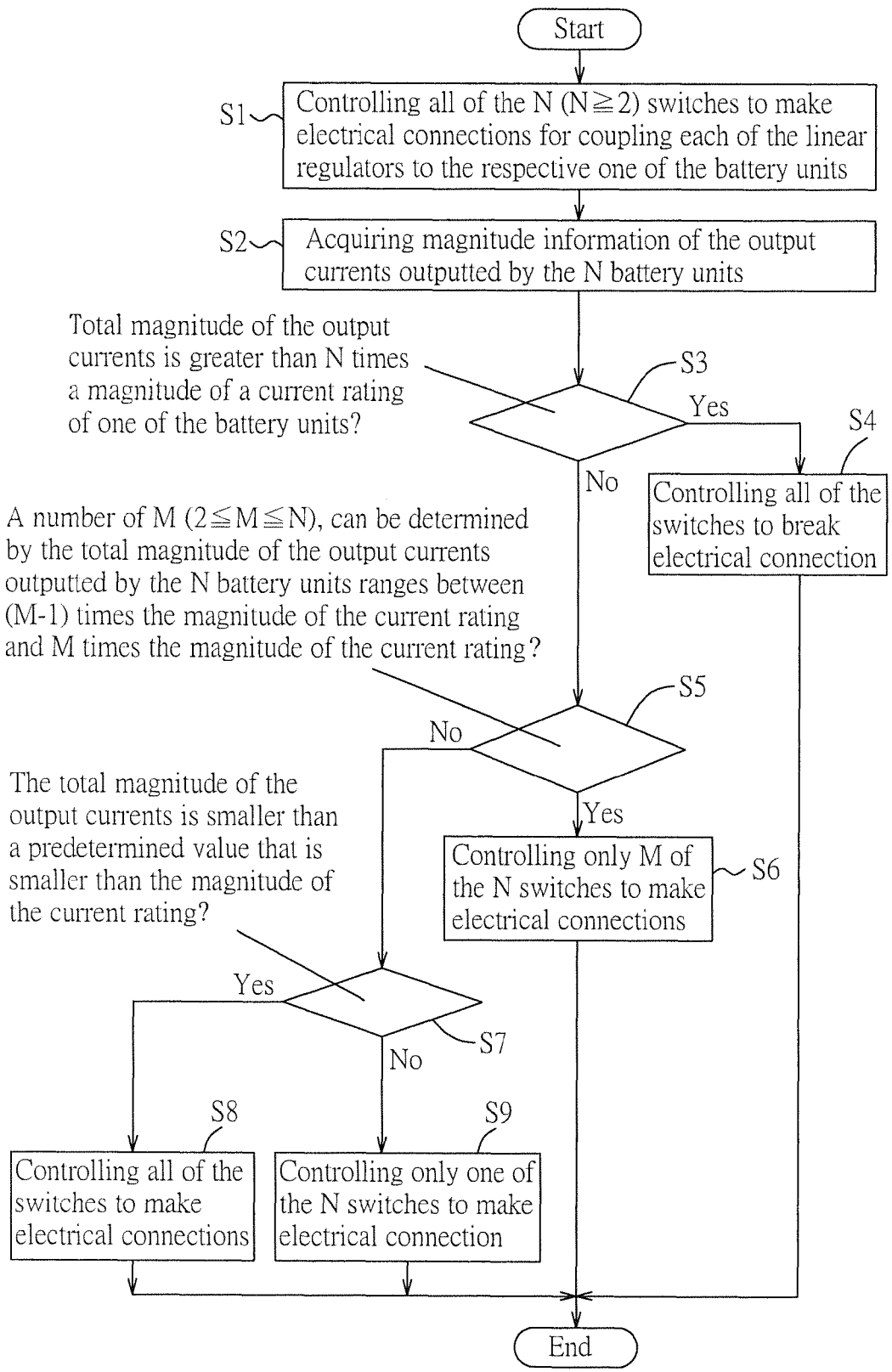
FIG. 5 is a flow chart illustrating steps of a preferred embodiment of a method for managing supply of electrical power according to the present invention.

Referring to FIG. 5, a flowchart that illustrates steps of a preferred embodiment of a method for managing supply of electrical power by a battery module is exemplified using the battery module 300 shown in FIG. 2. At the start of a discharge period of the battery module 300, the battery management unit 30 performs step S1 to control all of the switches SW1, SW2 and SW3 (in this embodiment, N=3) to make electrical connection for coupling each of the linear regulators 31-33 to the respective one of the battery units 41-43, so that each of the linear regulators 31-33 lowers the external battery voltage V_battery of the corresponding one of the battery units 41-43 to a voltage V_LR required by the load 10. At the same time, the output currents i1, i2, i3 of the battery units 41-43 respectively flow into the linear regulators 31-33, and are respectively outputted via the outputs of the linear regulators 31-33, thereby providing to the load 10 a total current i composed of the output currents i2, i3 outputted from the linear regulators 31, 32, 33 (i.e., i=i1+i2+i3).

A predetermined time period after step S1, the battery management unit 30 performs step S2 to acquire magnitude information of the output currents i1, i2, i3 outputted by the battery units 41, 42, 43, followed by performing step S3 to determine whether or not a total magnitude of the output currents i1, i2, i3 (i.e., a magnitude of the total current i) is greater than N times (in this embodiment, N=3) a magnitude of a current rating I (i.e., the maximum output current) of one of the battery units 41, 42, 43. When the determination made in step S3 is affirmative, which indicates occurrence of overcurrent, the battery management unit 30 performs step S4 to control all of the switches SW1, SW2, SW3 to break electrical connection for preventing the linear regulators 31-33 from being damaged due to the overcurrent. When the determination made in step S3 is negative, the battery management unit 30 performs step S5 to determine whether a number of M can be determined by the total magnitude of the output currents i1-iN outputted by the N battery units (i.e., the magnitude of the total current i) ranges between (M−1) times the magnitude of the current rating I and M times the magnitude of the current rating I, where 2≤M≤N. In this embodiment, N is equal to 3, so that M may be 2 or 3 if the determination made in step S5 is affirmative.

When the determination made in step S5 is affirmative as M=3, namely, the magnitude of the total current i ranges between two times (M−1=2) the magnitude of the current rating I and three times (M=3) the magnitude of the current rating I, the battery management unit 30 performs step S6 to control only M of the N switches to make electrical connections. Since M=N=3 in this condition, all of the switches SW1, SW2, SW3 are controlled to make electrical connections. When the determination made in step S5 is affirmative as M=2, namely, the magnitude of the total current i ranges between the magnitude of the current rating I (M−1=1) and two times (M=2) the magnitude of the current rating I, the battery management unit 30 performs step S6 to control only two of the three switches SW1, SW2, SW3 to make electrical connections. By such a control, the total current i is outputted by only two of the battery units 41-43 through the corresponding two of the linear regulators 31-33. For example, only the battery units 41, 42 that are respectively coupled to the linear regulators 31, 32 output the currents i1, i2 to averagely share the total current i, so as to have greater currents i1, i2 that respectively flow through the internal resistors Rb of the battery units 41, 42, resulting in greater voltage drop across the internal resistors Rb. Under this condition, the external battery voltages V_battery of the battery units 41, 42 are relatively small, thereby reducing voltage difference between the input and output of the corresponding linear regulators 31, 32. Therefore, power loss in the linear regulators 31, 32 is reduced, leading to higher conversion efficiencies of the linear regulators 31, 32.

In addition, it is known from equation (1) that, when the total current i required by the load 10 is so small that only one battery unit is required for provision of electrical power, since a product of the total current i (i.e., the total current i=Ib) and the resistance Rb of the internal resistor is relatively small compared to the voltage Vb of the internal voltage source, the external battery voltage V_battery is not effectively lowered. For example, assuming that the battery unit 41 with internal voltage Vb of 4V and internal resistance Rb of 25 mΩ is the only one battery unit that supplies current to the load 10, and the output current i1 (i.e., the total current i) thereof is 1 A, it is obtained from equation (1) that:

$$V\_battery = Vb - i \times Rb = 4V - 1\ A * 25\ m\Omega = 3.975V \quad (7)$$

In the case of equation (1), the output current i1 is so small that the voltage drop across the internal resistor Rb only results in 0.625% reduction to the external battery voltage V_battery. Such insufficient reduction of the external battery voltage V_battery may lead to undesired high voltage across the input and output of the linear regulator 31, thereby resulting in increase of power loss and rise of temperature for the linear regulator 31, and the linear regulator 31 may be damaged due to the sustained high temperature.

Hence, when the determination made in step S5 is negative, the battery management unit 30 performs step S7 to further determine whether or not the total magnitude of the output currents i1-iN (i.e., the magnitude of the total current i) is smaller than a predetermined value that is smaller than the magnitude of the current rating I (e.g., the magnitude of the current rating is 4 A, and the predetermined value is 1 A). When the determination made in step S7 is affirmative, which means that the magnitude of the total current i is too small, the battery management unit 30 performs step S8 to control all of the N (N=3 herein) switches SW1-SW3 to make electrical connections, so that all of the battery units 41-43 are coupled respectively to the linear regulators 31-33 for averagely sharing the total current i provided through the linear regulators 31-33. In this manner, all of the linear regulators 31-33 averagely share the power loss, thereby preventing damage to the linear regulators 31-33 from high temperature.

When the determination made in step S7 is negative, which means that the total magnitude of the output currents i1-iN (i.e., the magnitude of the total current i) ranges between the magnitude of the current rating I and the predetermined value, the battery management unit 30 performs step S9 to control only one of the switches SW1-SW3 to make electrical connection, so that only one of the battery units, as an example, the battery unit 41, is coupled to the corresponding linear regulator 31 for reducing the voltage across the input and the output of the linear regulator 31, reducing power loss in the linear regulator 31, thereby promoting conversion efficiency of the linear regulator 31.

Figure 6:
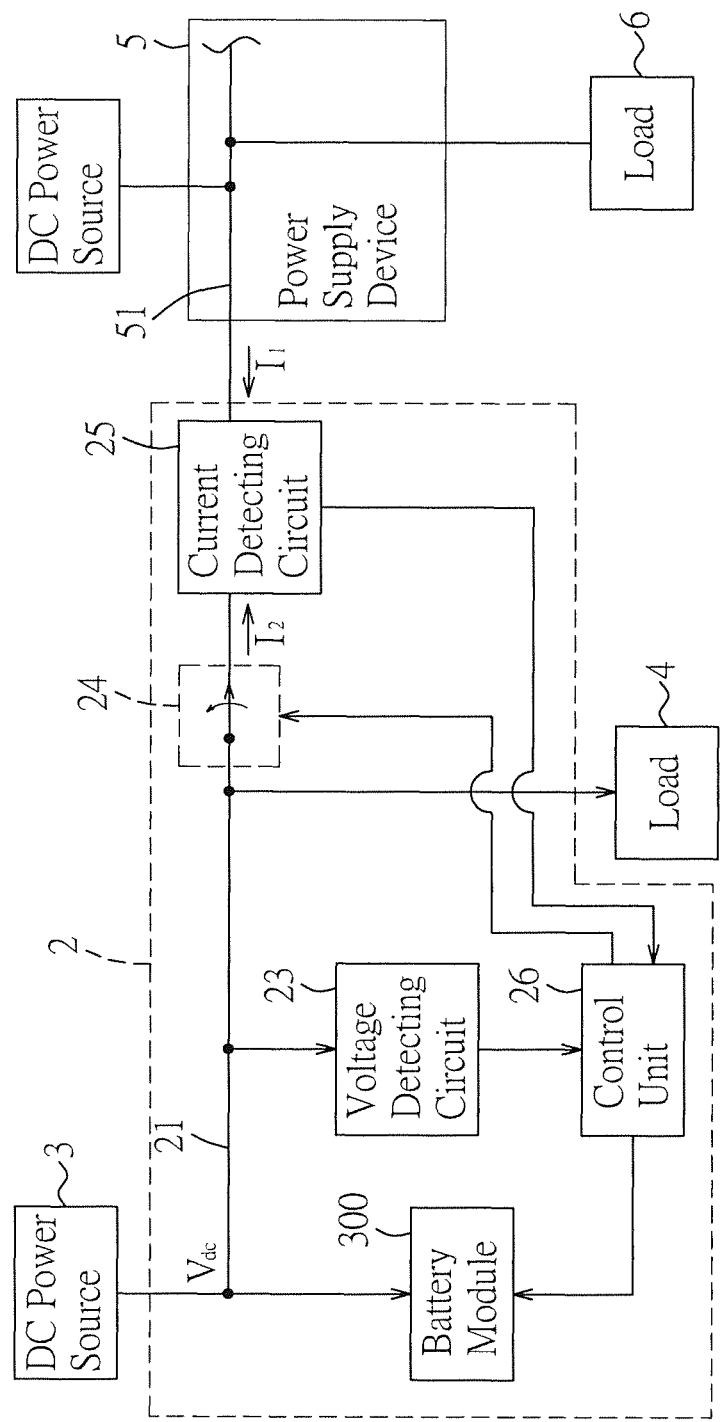
FIG. 6 is a block diagram illustrating a preferred embodiment of a power supply device including a battery module of the present invention.

FIG. 6 shows that the preferred embodiment of the battery module 300 may be applied to a power supply device 2, such as a DC uninterruptible power supply (UPS) device. The power supply device 2 receives an input from a DC power source 3 for supplying electrical power to a load 4, and is adapted to be coupled to another power supply device 5. The power supply device 2 includes a power cord 21, the battery module 300, a voltage detecting circuit 23, a power-cord switch 24, a current detecting circuit 25, and a control unit 26. In this embodiment, the power cord 21, which may be a DC bus, is coupled to the DC power source 3 and the load 4 for transmitting electrical power from the DC power source 3 to the load 4. In this embodiment, the load 4 may be any kind of electronic device or electronic equipment that uses DC electrical power, such as a notebook computer, a server, etc. Circuit configurations of the power supply device 5 and the power supply device 2 may be identical or different, and the current detecting circuit 25 is adapted to be coupled to a power cord 51 of the power supply device 5. It should be noted that, applications of the present invention are not limited to the DC UPS device, but are also suitable for relevant applications that include multiple parallel-connected pairs of battery unit and linear regulator.

The battery module 300 is coupled to the power cord 21 for receiving and storing electrical power from the DC power source 3.

The voltage detecting circuit 23 is coupled to the power cord 21 for detecting the voltage Vdc of the DC power source 3, is coupled to the control unit 26, and generates a first trigger signal when the voltage detecting circuit 23 detects that the voltage Vdc of the DC power source 3 is lower than a preset voltage value, which represents abnormal supply of electrical power by the DC power source 3 (e.g., cease of power supply or unstable power supply), and the control unit 26 controls the battery module 300 to output electrical power to the load 4 through the power cord 21 according to the first trigger signal, thereby achieving uninterrupted power supply to the load 4. At this time, each of the linear regulators 31-33 of the battery module 300 converts the external battery voltage V_battery of the respective one of the battery units 41-43 to a voltage having a magnitude that is the same as that of the DC power source 3 (i.e., a voltage required by the load 4), followed by outputting the converted voltage to the power cord 21. As mentioned above, the battery module 300 determines a number of the battery units for output of the current according to the magnitude of the total current i required by the load 4, so as to optimize conversion efficiencies of the linear regulators, to reduce temperature rising of power elements, and to prolong service life of the battery module 300. Accordingly, an overall size, electric power consumption and cost of the power supply device 2 that employs the battery module 300 may be relatively reduced, and response time of the power supply device 2 may be improved, thereby achieving promotion of operating efficiency of the overall system.

The power-cord switch 24 is coupled to the power cord 21 for making or breaking electrical connection between the current detecting circuit 25 and the power cord 21, and is controlled by the control unit 26. Under normal operation, the power-cord switch 24 operates in ON-state, namely, the power-cord switch 24 always makes electrical connection between the power cord 21 and the current detecting circuit 25. When supply of electrical power of both of the power supply device 2 and the power supply device 5 is normal, each of a first current I1 outputted by the power supply device 5 and a second current I2 (i.e., a power-cord current which flows in the power cord 21 from the DC power source 3 to the current detecting circuit 25) outputted by the power supply device 2 is sufficient for loads 6 and 4, respectively, and it is not necessary for the power supply device 2 to provide the second current I2 to the power supply device 5. In other words, when the first current I1 and the second current I2 have substantially the same magnitude, it is not necessary for the power supply device 2 to provide the second current I2 to the power supply device 5, and vice versa. When the power supply device 2 does, and the power supply device 5 does not supply electrical power normally, the second current I2 outputted by the power supply device 2 may be promptly provided to the power supply device 5 through the power cord 21, the power-cord switch 24, the current detecting circuit 25 and the power cord 51, so as to maintain electrical power supply to the load 6 until the power supply device 5 is restored to normal supply of electrical power, thereby achieving uninterrupted power supply from the power supply device 5. Even if electrical power is supplied by the battery module 300 of the power supply device 2 due to abnormal power supply by the DC power source 3, the electrical power may also be provided to the power supply device 5 through the power cord 21, the power-cord switch 24, the current detecting circuit 25 and the power cord 51.

Furthermore, the current detecting circuit 25 is configured to continuously detect the second current I2 that flows in the power cord 21 from the power supply device 2 to the power supply device 5 (i.e., that flows through the power-cord switch 24), and generates a second trigger signal to the control unit 26 when the current detecting circuit 25 detects that the second current I2 is greater than an over-current-protection setpoint, for example, when a short circuit occurs in the power supply device 5. The control unit 26 controls the power-cord switch 24 to break electrical connection between the power cord 21 and the current detecting circuit 25 according to the second trigger signal so as to prevent possible damage to circuits of the power supply device 2 from the overcurrent.

Figure 7:
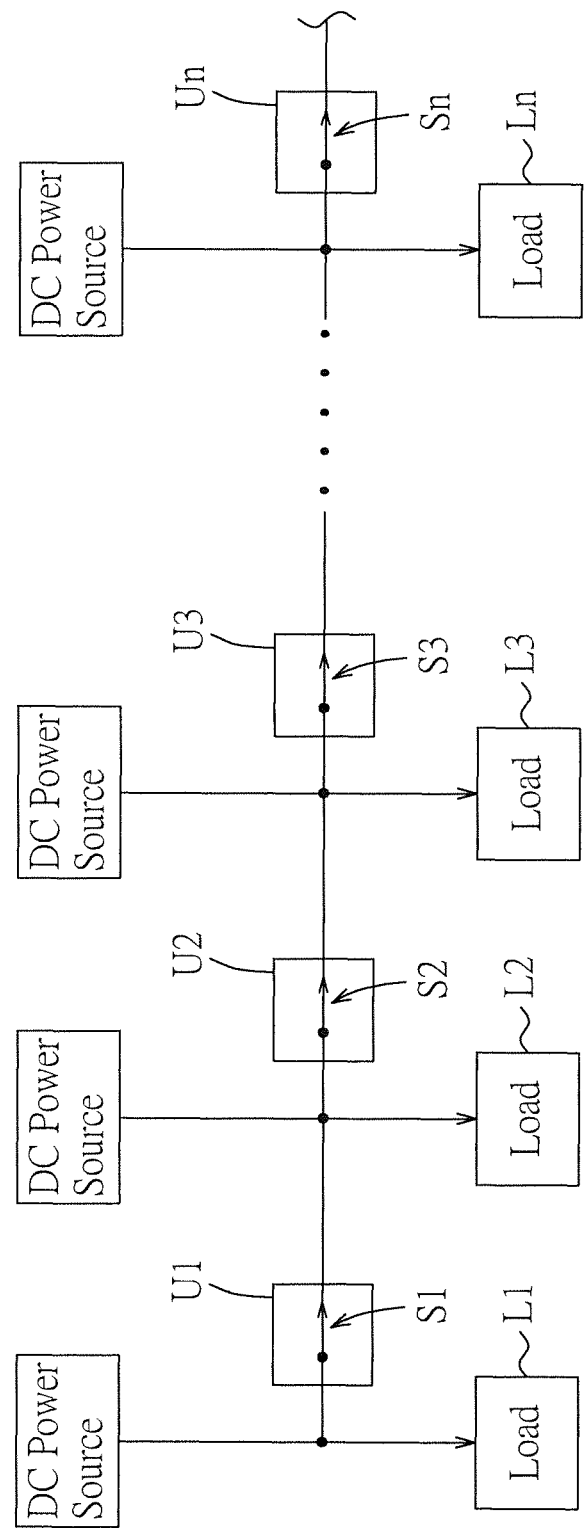
FIG. 7 is a schematic circuit diagram illustrating that a plurality of the power supply devices are coupled in a form as shown in FIG. 6, and the power supply devices may mutually support each other when providing electrical power.

FIG. 7 shows that a plurality of the power supply devices U1~Un according to the preferred embodiment are coupled in series through the power-cord switches S1~Sn thereof. When one of the power supply devices U1~Un, for example, the power supply device U3, is unable to normally provide electrical power to its load L3, the power supply device U2 may immediately detect such a condition, and control the power-cord switch S2 to make electrical connection between the power cords of the power supply devices U2 and U3, so as to supply electrical power promptly to the load L3 that is coupled to the power supply device U3. Similarly, when the power supply device U2 is unable to normally provide electrical power, the power supply device U1 may supply electrical power promptly to the power supply device U2, thereby achieving mutual support among the power supply devices U1~Un when providing electrical power.

It should be noted that the linear regulators of the battery module 300 used in this embodiment have advantages such as a relatively quick response, low power consumption, a small size, low cost, etc., so as to reduce the overall size, electric power consumption, and cost of the power supply device 2, and to promote response time of the power supply device 2.

Figure 8:
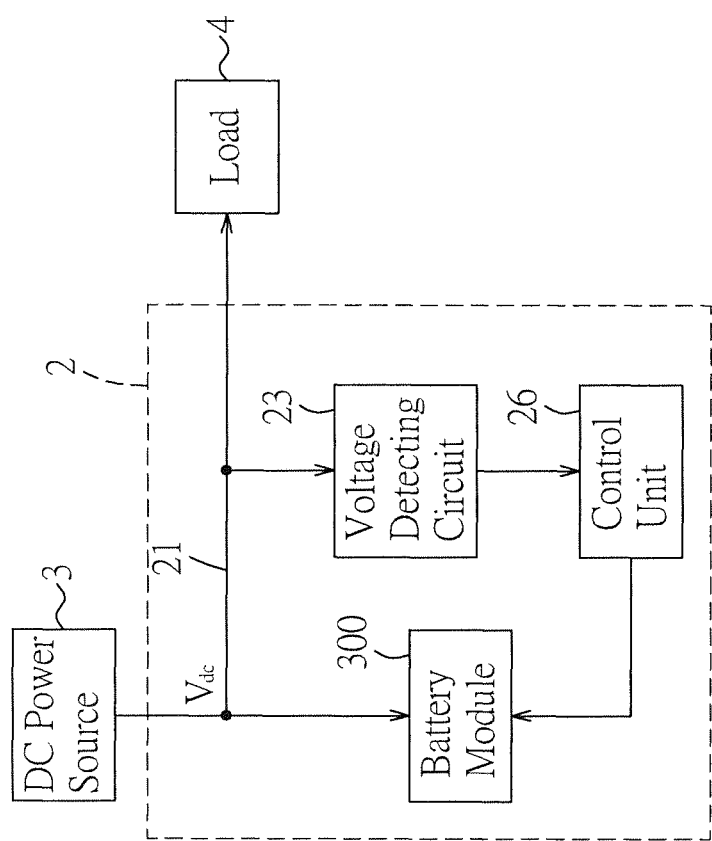
FIG. 8 is a block diagram illustrating another preferred embodiment of the power supply device according to the present invention.

Referring to FIG. 8, the power supply device 2 may be an independent DC UPS device (i.e., does not support electrical power to devices other than the load 4) that differs from the power supply device 2 shown in FIG. 6 by omitting the power-cord switch 29 and the current detecting circuit 25. In this case, the voltage detecting circuit 23 generates the first trigger signal to the control unit 26 when the voltage detecting circuit 23 detects that the voltage Vdc of the DC power source 3 is lower than the preset voltage value, so as to control the battery module 300 to output electrical power to the power cord 21 for the load 4, thus achieving uninterrupted power supply to the load 4. At this time, the battery module 300 determines a number of the battery units for output of the current according to magnitude of the current required by the load 4, thereby promoting operating efficiency of the overall system.

To sum up, the battery module 300 of this embodiment uses the battery management unit 30 to control a number the switches that make electrical connections between the battery units and the inputs of the corresponding linear regulators according to the magnitude of the total current i required by the load (i.e., to control a number of the battery units that provide electrical power to the load), so as to obtain a relatively small external battery voltage V_battery for each of the battery units that is coupled to the corresponding linear regulator for reducing power loss in the linear regulators, thereby promoting conversion efficiencies of the linear regulators and reducing temperature rising of power elements. Moreover, using the linear regulator as a voltage drop converting circuit may reduce size and prolong service time of the battery module 300, may reduce an overall size, electric power consumption and cost of the power supply device 2 that uses the battery module 300, and may enhance response time performance of the power supply device 2.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for managing supply of electrical power by a battery module to a load, the battery module including N battery units, where N≥2, N linear regulators, N switches, and a battery management unit, each of the switches being coupled between a respective one of the battery units and an input of a respective one of the linear regulators, outputs of the linear regulators being coupled together and coupled to the load, the battery management unit being configured to control each of the switches to make or break electrical connection between the respective one of the battery units and the input of the respective one of the linear regulators, said method comprising:

(A) controlling, by the battery management unit at the start of a discharge period of the battery units, all of the switches to make electrical connections for coupling each of the linear regulators to the respective one of the battery units, so that an output current of each of the battery units is output via the respective one of the linear regulators, thereby providing to the load a total current formed by the output currents from the linear regulators; and (B) acquiring, by the battery management unit, magnitude information of the output currents outputted by the N battery units, determining, by the battery management unit, whether or not a total magnitude of the output currents of the N battery units ranges between a magnitude of a current rating of one of the battery units and N times the magnitude of the current rating, and controlling, by the battery management unit when determination made thereby is affirmative, only M of the N switches to make electrical connections, where 2≤M≤N, and where the total magnitude of the output currents of the N battery units ranges between (M−1) times the magnitude of the current rating and M times the magnitude of the current rating.

2. The method as claimed in claim 1, further comprising, when the determination made in (B) is negative:
(C) controlling, by the battery management unit, all of the switches to make electrical connections when the battery management unit determines that the total magnitude of the output currents outputted by the N battery units is less than a predetermined value, the predetermined value being less than the magnitude of the current rating, and
controlling, by the battery management unit, only one of the N switches to make electrical connection when the battery management unit determines that the total magnitude of the output currents of the N battery units ranges between the predetermined value and the magnitude of the current rating.

3. The method as claimed in claim 1, further comprising, when the determination made in (B) is negative: (D) controlling, by the battery management unit, all of the switches to break electrical connections after the battery management unit acquires the magnitude information of the output currents of the N battery units and determines that the total magnitude of the output currents of the N battery units is greater than N times the magnitude of the current rating.

4. A battery module for supplying electrical power to a load, said battery module comprising:
N battery units, where N≥2;
N linear regulators, each of which has an input and an output, said outputs of said N linear regulators being coupled together and to be coupled to the load, wherein an output current of each of said battery units is output via a respective one of said linear regulators, thereby providing to the load a total current of the output currents from said linear regulators;
N switches, each of which is coupled between a respective one of said battery units and said input of a respective one of said linear regulators; and
a battery management unit configured to control each of said switches to make or break electrical connection between the respective one of said battery units and said input of the respective one of said linear regulators, said battery management unit controlling said switches based on a total magnitude of the output currents outputted by the N battery units.

5. The battery module as claimed in claim 4, wherein, at the start of a discharge period of said battery units, said battery management unit is configured to control all of said switches to concurrently make electrical connections for coupling said linear regulators to respective ones of said battery units.

6. The battery module as claimed in claim 5, wherein said battery management unit is configured to acquire magnitude information of the output currents of said N battery units, to determine whether or not the total magnitude of the output currents of said N battery units ranges between a magnitude of a current rating of one of said battery units and N times the magnitude of the current rating, and to control only M of said N switches to make electrical connections when the determination made thereby is affirmative, where 2≤M≤N, and where the total magnitude of the output currents of said N battery units ranges between (M−1) times the magnitude of the current rating and M times the magnitude of the current rating.

7. The battery module as claimed in claim 6, wherein, when the determination made by said battery management unit is negative, said battery management unit controls all of said switches to make electrical connections when said battery management unit determines that the total magnitude of the output currents of said N battery units is less than a predetermined value, the predetermined value being less than the magnitude of the current rating, and said battery management unit controls only one of said N switches to make electrical connection upon determining that the total magnitude of the output currents of said N battery units ranges between the predetermined value and the current rating.

8. The battery module as claimed in claim 6, wherein, when the determination made by said battery management unit is negative, said battery management unit controls all of said switches to break electrical connections upon determining that the total magnitude of the output currents of said N battery units is greater than N times the magnitude of the current rating.

9. The battery module as claimed in claim 4, further comprising a charging circuit controlled by said battery management unit, to be coupled to a direct-current power source for receiving electrical power therefrom, and operable to charge said battery units.

10. A power supply device adapted to receive an input from a direct-current (DC) power source and to supply electrical power to a load, said power supply device comprising:
a power cord to be coupled between the DC power source and the load for transmitting electrical power to the load;
a battery module coupled to said power cord for receiving and storing electrical power from the DC power source, said battery module including:
N battery units, where N≥2;
N linear regulators, each of which has an input and an output, said outputs of said N linear regulators being coupled together and to said power cord, wherein an output current of each of said battery units is output via a respective one of said linear regulators, thereby providing to the load a total current of the output currents from said linear regulators;
N switches, each of which is coupled between a respective one of said battery units and said input of a respective one of said linear regulators; and
a battery management unit configured to control each of said switches to make or break electrical connection between the respective one of said battery units and said input of the respective one of said linear regulators, said battery management unit controlling said switches based on a total magnitude of the output currents outputted by the N battery units;
a voltage detecting circuit coupled to said power cord; and
a control unit coupled to said battery module and said voltage detecting circuit.

11. The power supply device as claimed in claim 10, wherein said voltage detecting circuit generates a trigger signal when said voltage detecting circuit detects that a voltage of the DC power source is lower than a preset voltage value, and said control unit generates, according to the trigger signal, a control signal to control said battery module to output electrical power to the load through said power cord.

12. The power supply device as claimed in claim 11, wherein, at the start of a discharge period of said battery units, said battery management unit is configured to control all of said switches to concurrently make electrical connections for coupling said linear regulators to the respective ones of said battery units, so that an output current of each of said battery units is output via the respective one of said linear regulators to said power cord, thereby providing to the load a total current of the output currents from said linear regulators.

13. The power supply device as claimed in claim 12, wherein said battery management unit is configured to acquire magnitude information of the output currents of said N battery units, to determine whether or not the total magnitude of the output currents of said N battery units ranges between a magnitude of a current rating of one of said battery units and N times the magnitude of the current rating, and to control only M of said N switches to make electrical connections when the determination made thereby is affirmative, where 2≤M≤N, and where the total magnitude of the output currents of said N battery units ranges between (M−1) times the magnitude of the current rating and M times the magnitude of the current rating.

14. The power supply device as claimed in claim 13, wherein, when the determination made by said battery management unit is negative, said battery management unit controls all of said N switches to make electrical connections when said battery management unit determines that the total magnitude of the output currents of said N battery units is less than a predetermined value, the predetermined value being less than the magnitude of the rating current, and said battery management unit controls only one of said N switches to make electrical connection upon determining that the total magnitude of the output currents of said N battery units ranges between the predetermined value and the magnitude of the current rating.

15. The power supply device as claimed in claim 13, wherein, wherein, when the determination made by said battery management unit is negative, said battery management unit controls all of said switches to break electrical connections upon determining that the total magnitude of the output currents of said N battery units is greater than N times the magnitude of the current rating.

16. The power supply device as claimed in claim 10, wherein said battery module further includes a charging circuit controlled by said battery management unit, to be coupled to the DC power source for receiving electrical power therefrom, and operable to charge said battery units.

17. The power supply device as claimed in claim 10, further comprising:
  a power-cord switch coupled to said power cord and said control unit; and
  a current detecting circuit coupled to said power-cord switch and said control unit, and to be coupled to an external power cord.

18. The power supply device as claimed in claim 17, wherein said current detecting circuit generates a trigger signal when said current detecting circuit detects that a power-cord current, which flows in said power cord from said power supply device to the external power cord, is greater than an over-current-protection setpoint, said control unit controlling said power-cord switch to break electrical connection between said power cord and said current detecting circuit according to the trigger signal.

19. The power supply device as claimed in claim 18, wherein said power-cord switch maintains electrical connection between said power cord and said current detecting circuit before said current detecting circuit determines that the power-cord current is greater than the over-current-protection setpoint.

* * * * *